Nov. 13, 1951   W. L. GUILD   2,574,825
BARREL TRUCK

Filed Oct. 24, 1949   2 SHEETS—SHEET 1

INVENTOR.
William L. Guild
BY
Mason, Fenwick & Lawrence
ATTORNEYS

Nov. 13, 1951  W. L. GUILD  2,574,825
BARREL TRUCK
Filed Oct. 24, 1949  2 SHEETS—SHEET 2
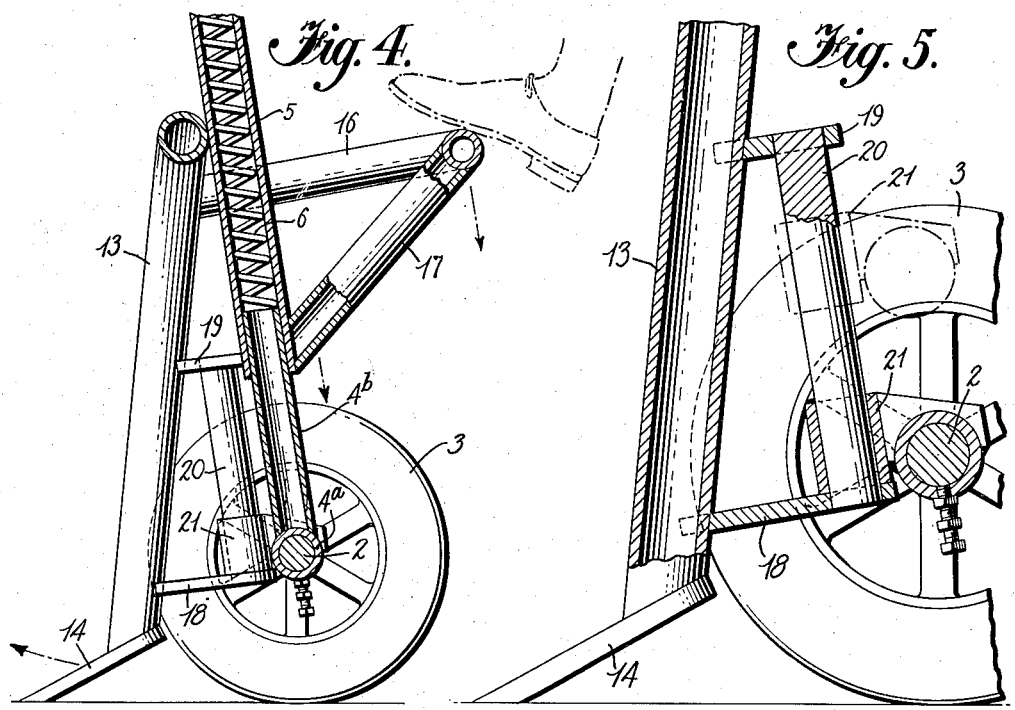
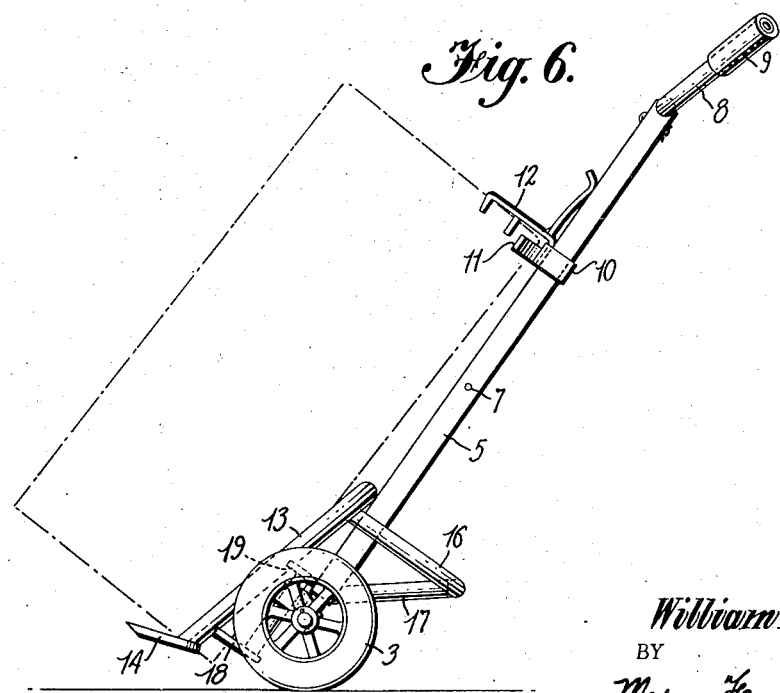
INVENTOR.
William L. Guild
BY
Mason, Fenwick & Lawrence
ATTORNEYS Patented Nov. 13, 1951

2,574,825

UNITED STATES PATENT OFFICE 2,574,825

BARREL TRUCK

William L. Guild, Keokuk, Iowa, assignor to Thomas Truck and Caster Co., Keokuk, Iowa, a corporation of Iowa Application October 24, 1949, Serial No. 123,120

3 Claims. (Cl. 214—65.4)

This invention relates to a two-wheel hand truck constructed for carrying barrels or drums.

An outstanding disadvantage of conventional types of barrel or drum trucks is that when the truck is unloaded or not in use, it stands either at a large angle relative to the vertical when on its wheels, or requires other support for standing at all, therefore creating difficulties in handling and requiring abnormal space for storage. Also, common types of trucks are generally not balanced when loaded, therefore require considerable lifting effort when transporting the load, furthermore, they generally do not permit easy "breaking over" during loading.

An object of the present invention is to provide a relatively strong, lightweight and inexpensive truck which is devoid of the above named disadvantages of conventional trucks.

A further object of the invention is to provide a two-wheel hand truck which is so constructed as to enable one man to easily load and transport loaded barrels or drums weighing as much as 1,000 pounds.

A more specific object of the invention is to provide a two-wheel hand truck having a spring suspended, retractable wheel and axle assembly that permits the wheels to rest on the floor at the same level as the toes of the truck when unloaded, thereby permitting the truck to stand upright without other support when not in use.

A further object of this invention is to provide a barrel truck which is constructed in a manner to permit automatic loading and unloading and to avoid the necessity on the part of the operator to touch the barrel being handled at any time during the "breaking over" process when loading a drum or barrel onto the truck, while transporting the load or while unloading from the truck.

Other objects and advantages of the present invention will become apparent from a study of the following specification taken with the accompanying drawings.

In the drawings:

Figure 4 is an enlarged, fragmentary side elevational view of the truck with parts in cross section to more clearly show the retractable wheel and axle assembly feature, also showing the position of the parts when the truck is standing upright or is unloaded;

Figure 5 is an enlarged, fragmentary side elevational view of the stabilizing guide and associated parts when the truck is unloaded; and Figure 6 is a side elevational view showing the truck loaded with a barrel or drum and in a position for wheeling the load.

Figure 1:
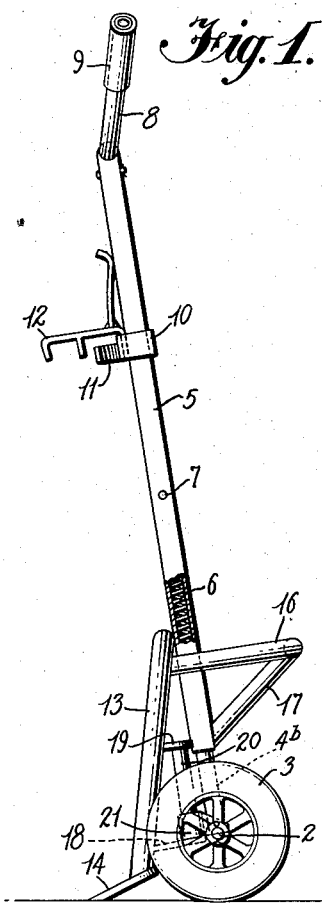
Figure 1 is a side elevational view, with a post portion shown broken away, of a two-wheel hand truck for carrying drums or barrels, shown in the position when not in use and embodying the principles of the present invention.

Referring more particularly to the drawings, there is shown a two-wheel hand truck for handling drums or barrels and made of tubular material, such as tubular metal stock or pipe. The truck comprises an axle 2 having secured to the ends thereof wheels 3—3, which may be of steel or covered with molded-on rubber or semi-steel or even pneumatic tires, if desired. Surrounding and journaled to the central portion of the axle 2 is a horizontally extending sleeve portion 4a of a T 4. The T has a vertical portion or plunger 4b which is telescopically fitted in a hollow post or standard 5.

Post 5 is preferably of tubular construction with a square shaped cross section. Helical spring 6 is enclosed within post 5 and its top end is anchored by a pin or bolt 7, whereas its bottom end rests against the end portion of the plunger 4b. A curved handlebar 8 has its midpoint welded to the top end of post 5. Such curved shape of the handlebar places the trucker's hands always in a natural position to control the load. On the extremities of the handlebar there are provided hand grips 9—9, of rubber or other suitable material.

Centrally of the post 5 there is slidably mounted and adjustably fastened a strap 10 which carries an arcuate drum supporting element 11 and a double hooked or two-in-one chime hook 12, thereby being adapted to fit any size of drum or barrel.

Attached to the lower end portion of post 5 is an inverted U-shaped, tubular lower frame member 13 having at the extremities thereof toes 14—14 of steel or other suitable material at an acute angle with respect thereto, and whose ends are preferably pointed to facilitate entry between the floor space and bottom of the barrel or drum when "breaking over" the load. Lower frame member 13 has fastened to spaced portions of its curved part a cross member or stand 16, also of substantially U-shaped construction, and to whose central portion there is welded a brace member 17, the other end of which brace member is welded to the bottom portion of post 5. Thus, the lower frame member 13 is rigidly fastened to post 5.

Near the extremities of the lower frame member 13 and adjacent the toes thereof are welded spaced spurs 18—18, and 19—19, having welded to their ends at substantially 90° relationship upright extending, stabilizing guides 20—20. The guides are slidably fitted or journaled within bearing members 21—21 journaled to the end portions of the axle 2. The spurs 18 and 19 serve as stop members for limiting the upward and downward movement of the stabilizing guides 20 when the wheel and axle are lifted or retracted, as will appear more clearly hereinafter.

Figure 2:
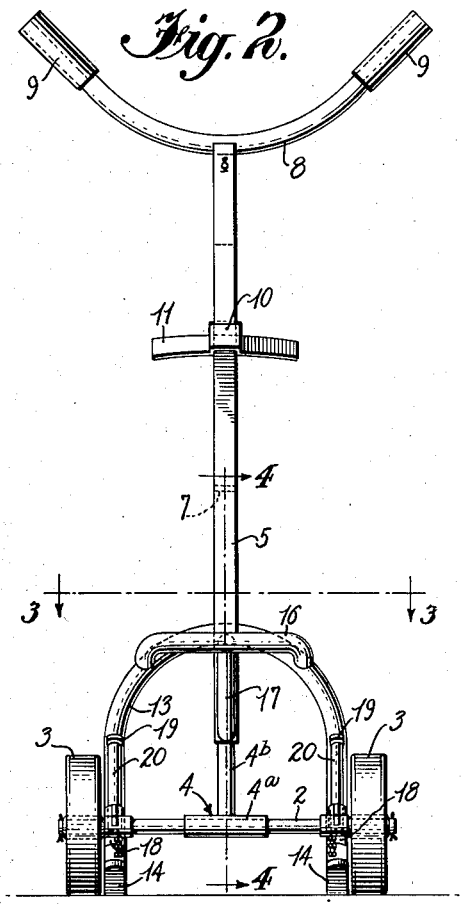
Figure 2 is a rear elevational view of the truck shown in Figure 1.
Figure 3:
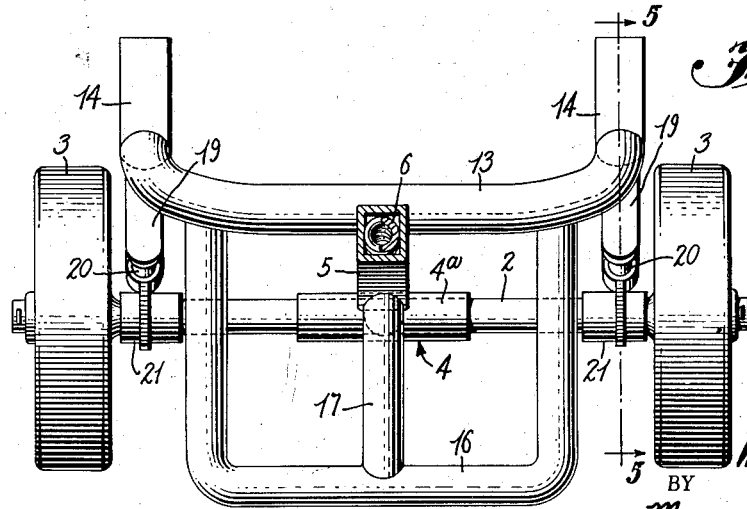
Figure 3 is an enlarged plan view of the wheel and axle assembly taken along line 3—3 of Figure 2.

In operation, when the truck is not in use, it will stand in an upright position, such as shown in Figures 1 and 2. Since the truck is unloaded, spring 6 will maintain plunger 4b in a downward or retracted position, as shown more clearly in Figure 4. Therefore, the wheels will rest on the floor at the same level as the toes 14—14. In other words, the toes serve as support members for supporting the hand truck vertically when the truck is unloaded. It will be apparent that by virtue of the normal vertically extending position of the truck, it can be stored in a minimum of space, such as in lockers or side by side with other trucks and is in readiness for operation at all times.

When it is desired to load a drum or barrel onto the truck, the operator adjusts strap 10 and chime hook 12 to the length thereof and depresses his foot on the cross member 16, as shown in Figure 4, exerting force in a downward direction. At the same time, he pulls the hand grips 9—9 towards him to effect "breaking over" of the load by lowering post 5 attached thereto and causing plunger 4b to project into the lower portion of the post and compress spring 6, thereby retracting the wheel and axle assembly. This retraction movement is arrested when spurs 19—19 abut against the top of bearing members 21. At the same time, the toes 14 are slid underneath the drum or barrel so that upon completion of the retracting movement of the wheel and axle assembly, the drum or barrel will be loaded onto the truck and securely cradled onto lower frame member 13 and supporting element 11, irrespective of its shape. The "breakover" and loading, therefore, are accomplished faster and more smoothly than possible with conventional trucks. Coil spring 6 provides perfect spring balance of the drum or barrel during "breakover."

After the drum has been loaded onto the truck following complete retraction of the wheel and axle assembly, the truck is moved into the position shown in Figure 6, and the load is wheeled. It will be observed that the toes 14 now are more forward of the axle than when in the unloaded or upright position shown in Figure 4, preferably about 5 inches more. This will effect balance of the drum or barrel while it is being wheeled by the operator so that all that is required on the part of the operator is a slight pushing force and no lifting strain whatsoever as is required in many conventional type trucks.

After the load has been wheeled to the unloading station, the operator tilts post 5 forwardly and the drum, without touching it, will slide off toes 14 onto the floor, thereby allowing spring 6 to retract the wheel and axle assembly, limited by abutment of spurs 18—18, against the bottom end of bearing members 21, as shown more clearly in Figure 5. Toes 14 are thus moved to substantially the same level as the bottom of the wheels, therefore, will support post 5 in substantially vertical upright position, as shown in Figures 1, 2, 4 and 5.

It will be seen, therefore, that the wheels will rest on the floor at all times before and during loading and unloading of the drum or barrel, as distinguished from many conventional types of trucks requiring lifting of the wheels and exertion on the part of the operator for this purpose. It will also be noted that the wheels and axle provide an adjustable fulcrum which by virtue of the spring suspension or spring balancing feature allows the fulcrum point to be at a greater distance from the handle bars when the truck is upright and not in use; that is, just before it is loaded, than it would be after the "breakover" is accomplished and the drum is loaded. This provides a greater moment arm initially and thereby greatly facilitates and speeds up "breakover" and loading. At the same time, by virtue of the spring resisted retracting movement of the wheel and axle as a consequence of loading, smoother "breakover" is accomplished. Furthermore, after loading and consequent shortening of the moment arm due to retraction of the wheel and axle assembly, the center of gravity of the drum is moved toward the axle to provide better balancing of the drum while being transported. It should be particularly noted that the load is not carried by the spring 6, but instead, rests against the lower frame 13 and is directly supported by the axle.

Thus, it will be seen that I have provided an efficient, relatively simple, lightweight but strong and perfectly balanced truck which is capable of handling excessively heavy barrels or drums and which is so constructed as to provide for automatic loading or unloading without the necessity for the operator to touch the barrel, and wherein, by virtue of a spring suspension of the wheel and axle assembly with respect to the post, the truck will stand in an upright position when not in use without other support, and when the drum or barrel is loaded thereon, the wheel and axle assembly will become retracted so as to shift the relative position of the barrel supporting toes with respect to the axle so as to provide better balance of the load while it is being transported by the truck, thereby eliminating lifting strain on the part of the operator and instead requiring only a slight pushing force.

While I have illustrated and described a certain specific embodiment of my invention, it will be apparent that this is by way of illustration only, and that various changes and modifications may be made within the contemplation of my invention and within the scope of the following claims.

Having thus described my invention, I claim:

1. A truck for barrels or drums comprising. axle means having a pair of wheels journaled at the ends thereof, a substantially upright plunger secured to the central portion of said axle means, a hollow post telescopically fitted to said plunger, a helical spring enclosed in said post and having one end rigidly fastened to said post and the other end supported on the end portion of said plunger, an inverted U-shaped lower frame member having its central portion integrally secured to the lower end portion of said post and having load bearing toes extending from the extremities thereof, spaced spurs integrally formed on each of the extremities of said lower frame member, an integral stabilizing guide rod extending between said spurs on each of said extremities, and sleeve means slidably mounted for rectilinear movement on each of said rods having integral bearing means supporting said axle means, said toes being at substantially the same level as the floor contacting portions of the wheels when the truck is unloaded and being at a greater distance from the axle when the truck is loaded as compared to when it is unloaded as the result of compression of said spring the truck load is rested on said toes.

2. A drum truck comprising an axle having a pair of wheels mounted on the ends thereof, a tubular T having one leg surrounding the central portion of said axle and the other leg in the form of a plunger, a hollow post having a curved handle bar fastened to the top end thereof, a chime hook slidably mounted on said post to selective fixed positions to accommodate different drum lengths, an inverted substantially U-shaped tubular lower frame member, a substantially U-shaped cross member whose extremities are welded to said lower frame member, a brace member having one end welded to the central portion of said cross member and the other welded to the bottom portion of said post, toes extending at an obtuse angle from the extremities of said lower frame member, spaced spur elements integrally formed on each of the extremities of said lower frame member, a pair of stabilizing guide elements, each extending at an angle from and connected to the extremities of said spaced spur elements, bearing members for journalling the end portions of said axle for slidably mounting said stabilizing guide elements, and a compression spring contained within said post and having one end secured to said post and the other end engageable with said plunger whereby said plunger and axle will be retracted with respect to said post while compressing said spring as the result of placement of the load on said toes and application of force to said cross member and to said handle bars for "breaking over" the load to the drum loaded position, thereby spring balancing the load during said "breaking over" operation, said toes being at the same height as the floor contacting portions of the wheels when the truck is unloaded and not in use, thereby supporting the truck in an upright position.

3. A drum truck comprising an axle having a pair of wheels mounted on the ends thereof, a tubular T having one leg surrounding the central portion of said axle and the other leg in the form of a plunger, a hollow post having a handle bar at the top end thereof, a lower frame member having two downwardly extending spaced legs, load bearing toes extending at an obtuse angle from the lower extremities of said legs, elongated stabilizing guide elements formed on each of said legs, bearing members journalling the end portions of said axle having a sliding guide connection with said guide elements providing rectilinear movement for said bearing members, and a compression spring contained within said post and having one end secured to said post and the other end engageable with said plunger whereby said plunger and axle will be retracted with respect to said post while compressing said spring as the result of placement of said load on said toes and application of force to said handle bars for "breaking over" the load to the drum loaded position, thereby spring balancing the load during said "breaking over" operation, said toes being at the same height as the floor contacting portions of the wheels when the truck is in an unloaded state for supporting the truck in an upright position.

WILLIAM L. GUILD.

REFERENCES CITED

The following references are of record in the file of this patent:

UNITED STATES PATENTS

| Number | Name | Date |
|---|---|---|
| 1,649,940 | Willmot | Nov. 22, 1927 |
| 2,150,503 | Hawkins | Mar. 14, 1939 |
| 2,260,698 | Beebout | Oct. 28, 1941 |

FOREIGN PATENTS

| Number | Country | Date |
|---|---|---|
| 601,193 | Great Britain | Apr. 29, 1948 |
| 608,651 | Great Britain | Sept. 17, 1948 |